United States Patent
Racca et al.

[11] Patent Number: 6,024,930
[45] Date of Patent: Feb. 15, 2000

[54] OZONE GENERATOR PLATE

[75] Inventors: William H. Racca, Riverside, R.I.; Edward F. Racca, Ashland, Mass.

[73] Assignee: Quantum Electronics Corporation, Warwick, R.I.

[21] Appl. No.: 08/855,000

[22] Filed: May 13, 1997

Related U.S. Application Data

[63] Continuation-in-part of application No. 08/689,333, Aug. 8, 1996, abandoned.

[51] Int. Cl.[7] .................................................... B01J 19/12
[52] U.S. Cl. ........................................................ 422/186.07
[58] Field of Search ....................................... 422/186.07

[56] References Cited

U.S. PATENT DOCUMENTS

| | | | |
|---|---|---|---|
| 829,790 | 8/1906 | Joseph | 422/186.07 |
| 1,975,424 | 10/1934 | John | 204/32 |
| 1,975,435 | 10/1934 | Sanfilippo | 280/33.14 |
| 2,952,606 | 9/1960 | Pascale et al. | 204/314 |
| 3,081,215 | 3/1963 | Held et al. | 156/286 |
| 3,337,784 | 8/1967 | Lueder | 317/262 |
| 3,457,160 | 7/1969 | Fortier | 204/319 |
| 4,666,679 | 5/1987 | Masuda et al. | 422/186.02 |
| 4,892,713 | 1/1990 | Newman | 422/186.07 |
| 5,185,903 | 2/1993 | Choi | 15/339 |
| 5,407,639 | 4/1995 | Watanabe et al. | 422/186.07 |
| 5,417,936 | 5/1995 | Suzuki et al. | 422/186.07 |

*Primary Examiner*—Daniel J. Jenkins
*Attorney, Agent, or Firm*—Barlow, Josephs & Holmes, Ltd.

[57] ABSTRACT

An ozone generator plate has a first electrode with a pattern on a dielectric plate and a second electrode on the opposite side of the plate that is larger than the first electrode so that corona is developed for a finite distance beyond the edges of the first electrode on the surface of the dielectric plate. The dielectric plate is preferably a ceramic and the electrodes are coated on the ceramic with nickel chromium alloy overcoated with at least palladium and a lead tin alloy.

8 Claims, 2 Drawing Sheets

OZONE GENERATOR PLATE

CROSS REFERENCE TO RELATED APPLICATION

This application is a continuation-in-part of our application Ser. No. 08/689,333, filed Aug. 8, 1996, abandoned.

BACKGROUND OF THE INVENTION

The invention relates to air purifying apparatus and more particularly to the generator plate, monolithic in construction, particularly useful at high frequency energization.

In the past the generator plate has generally consisted of a structure that would provide a large number of edges that would tend to initiate a corona discharge. With this type of design, ozone is generated only around the perimeter of the electrode. As early as in a 1906 patent to Joseph, U.S. Pat. No. 829,790, two screens were provided and the screens were separated by mica insulation. Even more recently in 1969, the prior art Fortier U.S. Pat. No. 3,457,160 illustrates screens separated by glass insulation. In all these designs, the mica insulation must be bigger in surface area than each electrode in order to prevent ionizing directly from the top electrode to the bottom electrode. Variations have appeared such as illustrated by Pascale et al, U.S. Pat. No. 2,952,606, where in 1960 perforated tubular members were used in lieu of screens. The patent to Lueder, U.S. Pat. No. 3,337,784 illustrates the use of a serpentine pattern on a glass substrate. Structures such as exist in the art are difficult to clean, and do not have a sufficient longevity since the screens can burn out with the high temperatures developed by the corona discharge. Additionally these common ozone generators are operated at 60 Hz and require a very high operating voltage for a satisfactory ozone yield.

SUMMARY OF THE INVENTION

A generator plate in accordance with this invention has a pair of planar electrodes deposited upon a plate preferably of ceramic to act as the dielectric. One planar plate is a continuous surface while the opposite plate is configured in an irregular serpentine pattern such as a "tree" with a plurality of branches or a star. Each of the "branches" is configured to provide a plurality of "points" that enhance the development of an electron field and the resulting corona. By creating a plate design with the bottom electrode larger in surface area than the top electrode, the electron field is limited to the perimeter of the top electrode and to the outer edge of the bottom electrode (as viewed in phantom).

To create the electrodes, they are preferably deposited on the ceramic. Nichrome, a nickel chromium alloy, is the preferable material as it adheres to the ceramic. Layers of other metals may then be deposited thereon and the outermost layer must be tinned with a layer of 60/40 solder or an equivalent other metal that will withstand the high heat developed by the corona field and this overcoat of metal can be one that might itself develop "points" or pinnacles to enhance the electron field development. As an alternate, the ceramic may be coated by vacuum deposition and the metals sputtered thereon. First nickel chromium, then palladium, copper and finally a gold flash. The resulting structure is then tinned with solder to a maximum thickness if 0.025". If the electrodes are not tinned, it has been found that they will vaporize in the high heat of the corona field.

The invention has a number of significant advantages as the structure is very simple and easy to service since it consists of a flat plate with deposited electrodes. Further, this apparatus produces ozone from voltages in the kilohertz range, preferably in excess of 40 Khz. The high frequency is not audible and uses only voltages in the range of 2 kv to produce ozone at the rate of approximately 45 mg/hr for a 0.5"×0.25" size plate.

DETAILED DESCRIPTION OF THE PREFERRED EMBODIMENT

The generator of this invention is particularly characterized with a bottom electrode larger that the top electrode and uses point radiators for the top electrode configuration. Thus, when the top electrode is cut into a serpentine pattern, the points will radiate with a high field concentration. By controlling the shape of the bottom electrode, the electron field will be drawn out from the perimeter of the top electrode to the perimeter of the bottom electrode (as viewed in phantom).

Figure 1:
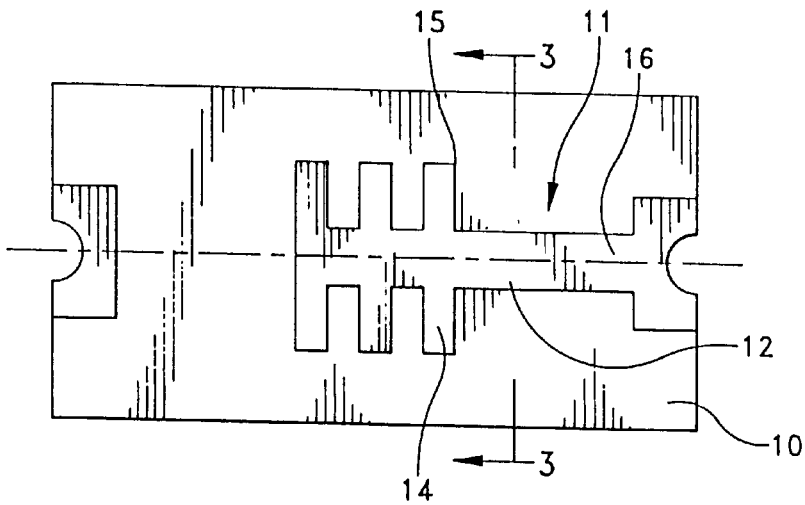
FIG. 1 is a top view of the preferred form of a generator plate of the invention.
Figure 4A:
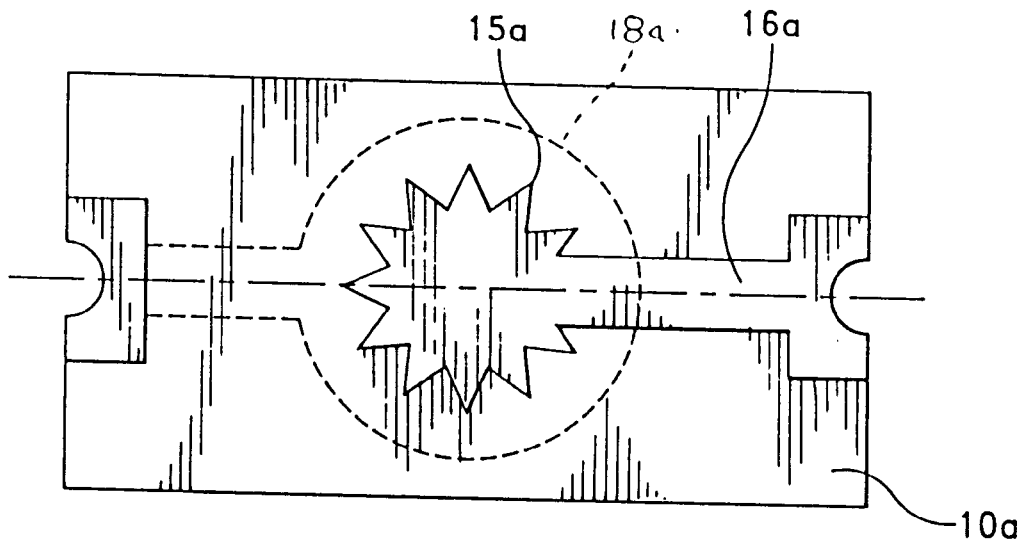
FIGS. 4A and 4B are plan views of alternate configurations in accordance with the invention.
Figure 4B:
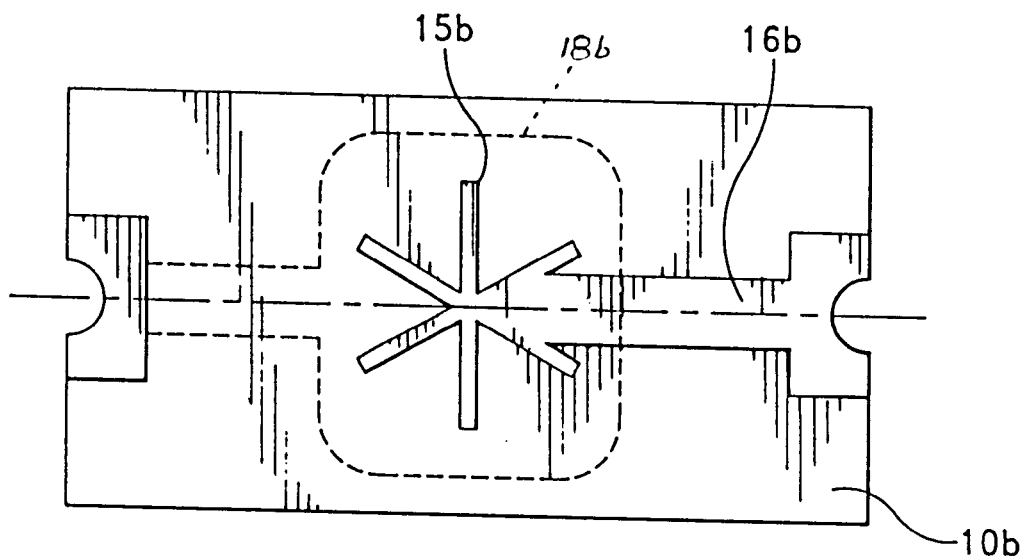

Referring now to the drawings, the generator plate 10 is a rectangular piece of ceramic on the order of 0.025" (0.6 mm). As seen in FIG. 1, the top electrode 11 is a "tree" deposited on the plate 10 and comprises a trunk or stem 12 and a plurality of branches or arms 14 that form the points. While there is illustrated six branches, it should be understood that the configuration and the number can be varied to the whim of a designer. As seen in FIGS. 4A and 4B the alternate configurations are a "star" or a multipointed figure. The notable feature of all the arrangements are the plurality of "points" 15a and 15b that are provided with the illustrated design. Connection to the source of e.m.f. is provided at 16.

Figure 2:
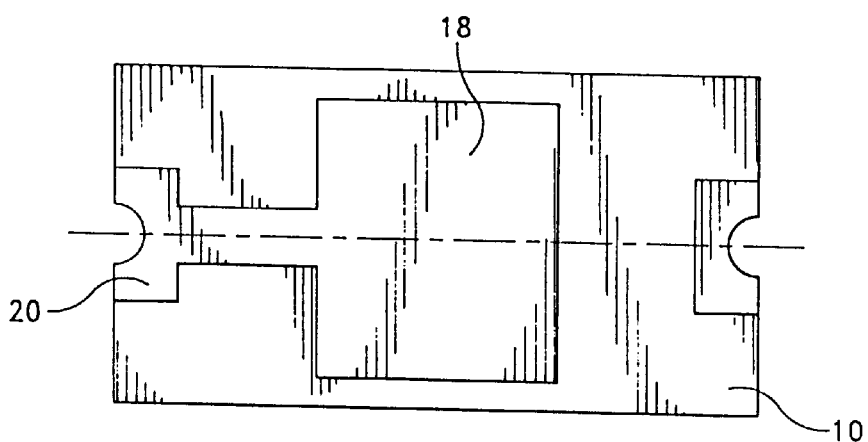
FIG. 2 is a bottom view thereof.

As seen in FIG. 2, the other side of the ceramic dielectric 10, is coated with a rectangular conductive area 18, and has a connection at 20 that is connected to a source of e.m.f. This bottom electrode should be larger than the top electrode. It is preferred that the overlap on each edge be approximately two to four times the thickness of the substrate plate 10. The top electrode should be centered above the bottom electrode. If the overlap of the perimeter of the bottom electrode is greater than the two to four times the substrate thickness, it diminishes the resulting boundary field effect and may require an increase in source voltage.

It has been found that the creation of the electrodes is somewhat critical to the successful operation of the invention since there is an intense plasma field generated that can deteriorate electrodes. The alumina or silica plate is coated by vacuum deposition by first applying nickel chromium alloy as this readily adheres to the alumina or silica. Next a layer of palladium is applied to prevent the oxidation of the nickel chromium. Masks are used to develop a pattern a step known well in the art, and after baking the structure of the electrodes is plated with gold, copper and gold in that order. The alternate plating may consist of copper then silver. The last step is to tin the electrodes with a lead tin solder such as 60/40 to an approximate thickness of 0.025" which prevents the metals forming the electrodes from sputtering off in the high heat of the plasma field.

Figure 3:
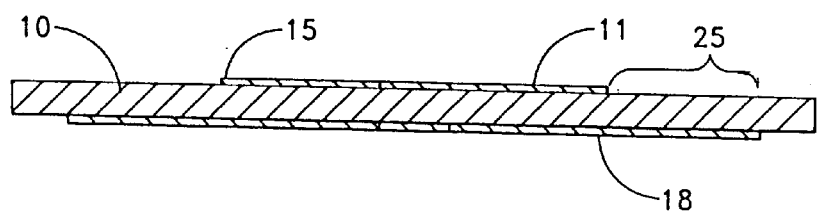
FIG. 3 is a sectional view taken on line 3—3 of FIG. 1.

When a voltage (e.m.f.) is applied to the connections a voltage gradient is developed between the edges of the top electrode and the electrode 18, whether it be a "tree" or a "star", the air ionizes and a controlled electron field is created that releases electrons. As seen in FIG. 3 the corona begins initially at the points on the branches of the tree or star and establishes itself toward the outer periphery of the ceramic insulating plate to substantially the location of the boundary of the bottom electrode, for example, illustrated by the bracket 25. It appears that the electrons tend to migrate toward the bottom electrode 18 along the "top" surface of the ceramic plate 10. The free electrons create visible UV light and release energy when striking the denser ceramic, i.e. by rapidly decelerating this energy creates UV at 253.7 Å and, with airflow over the corona field, $O_3$ is created from $O_2$ molecules.

In noting the performance of the plate of the invention, it has been observed that as the frequency is increased the corona field is created more rapidly. To understand this, it should be noted that the electrodes form essentially a capacitor and with the application of the proper frequency for the configuration of the electrodes, the plate will effectively self resonate.

The generator plate of this invention is particularly suited for energization from a source of r.f. This avoids the usual application of high alternating voltages that are found in the prior art. Because of the frequency of operation, preferably above 40 kHz, there is no arcing present and hence no generation of pungent nitrous oxide. The ozonifying action that has been demonstrated with this invention has resulted in the production of 45 mg/hr of ozone with standard air as an oxygen ($O_2$) source. It is thus evident that this invention serves as an efficient device for the treatment of air and requiring the use of only one plate.

In FIGS. 4A and 4B, there is shown a star burst design with a plurality of points 15a, 15b around its periphery and an asterisk pattern consisting of a plurality of bars that intersect at a common point that also provides a number of points to initially establish the electron field. The bottom electrodes 18a and 18b are illustrated in dotted lines.

It would be appreciated by those skilled in the art that various changes and modifications can be made to the illustrated embodiments without departing from the spirit of the present invention. All such modifications and changes are intended to be covered by the appended claims.

We claim:

1. A generator plate comprising a dielectric plate having a first surface upon which is deposited a conductive layer of metallic material that has a tin and lead alloy coating thereon, an opposite surface having deposited thereon metallic material having a configuration exhibiting a plurality of edges and being coated with a layer of a tin and lead alloy, a conductor leading from each surface deposition for connection to a source of e.m.f.

2. A plate as in claim 1 wherein the said opposite surface has a central stem and a plurality of arms radiating therefrom at right angles thereto.

3. An ozone generator plate comprising a dielectric member with electrodes on opposite sides thereof, one of the electrodes exhibiting a planar structure having a plurality of points, the opposite electrode having a surface larger that the first electrode whereby the peripheral overlap of said bottom electrode is a dimension between two to four times the thickness of the dielectric member, both electrodes being spaced from the edge of the dielectric member.

4. An ozone generator plate as in claim 3 wherein the said one of the electrodes on the planar dielectric surface is in the form of an asterisk.

5. An ozone generator plate as in claim 3 wherein the said one of the electrodes on the planar dielectric surface is in the form of a starburst with a plurality of points emanating from a solid center.

6. An ozone generator plate having a ceramic dielectric member coated on opposite surfaces with electrodes of at least nickel chromium and overcoated with palladium and a lead tin alloy.

7. An ozone generator plate as in claim 6 wherein the dielectric member is alumina or silica and the palladium layer is overcoated with copper and gold.

8. A generator plate as in claim 6 wherein the dielectric member is alumina or silica and the palladium is overcoated with copper and silver.

* * * * *